(12) United States Patent
Stineman, Jr. et al.

(10) Patent No.: US 7,613,936 B2
(45) Date of Patent: Nov. 3, 2009

(54) DUAL-MODE DETECTION OF POWERED DEVICE IN POWER OVER ETHERNET SYSTEM

(75) Inventors: John Arthur Stineman, Jr., Carpinteria, CA (US); Jeffrey Lynn Heath, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 549 days.

(21) Appl. No.: 11/252,624

(22) Filed: Oct. 19, 2005

(65) Prior Publication Data

US 2006/0164775 A1   Jul. 27, 2006

Related U.S. Application Data

(60) Provisional application No. 60/646,509, filed on Jan. 25, 2005.

(51) Int. Cl.
*G06F 1/00* (2006.01)
(52) U.S. Cl. .................... 713/300; 709/220; 324/607
(58) Field of Classification Search ............ 324/607; 709/220; 713/300
See application file for complete search history.

(56) References Cited

U.S. PATENT DOCUMENTS

| | | | |
|---|---|---|---|
| 6,459,275 B1 * | 10/2002 | Ewalt et al. ............. 324/539 |
| 6,973,394 B2 | 12/2005 | Jaeger et al. |
| 7,082,372 B2 * | 7/2006 | Rakshani et al. ............. 702/60 |
| 7,248,097 B2 * | 7/2007 | Montgomery ............. 327/538 |
| 7,356,588 B2 * | 4/2008 | Stineman et al. ............. 709/224 |
| 2002/0191553 A1 | 12/2002 | Lehr et al. |
| 2004/0212423 A1 | 10/2004 | Inagaki |
| 2004/0260794 A1 * | 12/2004 | Ferentz et al. ............. 709/220 |
| 2005/0003795 A1 | 1/2005 | Lehr et al. |
| 2006/0092000 A1 * | 5/2006 | Karam et al. ............. 340/310.11 |
| 2006/0291405 A1 * | 12/2006 | Karam ............. 370/284 |

FOREIGN PATENT DOCUMENTS

| | | |
|---|---|---|
| CN | 1364026 A | 8/2002 |
| CN | 1157022 C | 7/2004 |
| CN | 1540858 A | 10/2004 |

OTHER PUBLICATIONS

Maxim Integrated Products, IEEE 802.3 af PD interface controller For Power-Over-Ethernet, 19-2991. Rev 0, Oct. 2003.*
International Search Report and Written Opinion of the International Searching Authority issued in corresponding International Patent Application No. PCT/US2006/000341, dated Oct. 18, 2006.

(Continued)

*Primary Examiner*—Thomas Lee
*Assistant Examiner*—Vincent T Tran
(74) *Attorney, Agent, or Firm*—McDermott Will & Emery LLP

(57) ABSTRACT

Novel circuitry and methodology for detecting a Powered Device (PD) in a system for providing power to the PD. PD detection circuitry detects the PD in a first mode by providing detection current to probe the PD, and in a second mode by providing detection voltage to probe the PD. A control circuit determines that the PD is a valid device if the PD is detected both in the first mode and in the second mode.

20 Claims, 4 Drawing Sheets

OTHER PUBLICATIONS

Mendelson, "All You Need to Know About Power over Ethernet (PoE) and the IEEE 802.3af Standard," PowerDsine Proprietary Information, Jun. 2004, XP-002372480, URL: http://www.powerdsine.com/Documentation/WhitePapers/PoE_and_IEEE802_3af.pdf.

Chinese Office Action issued in Chinese Patent Application No. 200680005472X dated Nov. 7, 2008.
Chinese Office Action issued in Chinese Patent Application No. 2006800031997 dated Nov. 7, 2008.
Chinese Office Action issued in Chinese Patent Application No. 2006800031925 dated Nov. 7, 2008.

* cited by examiner

DUAL-MODE DETECTION OF POWERED DEVICE IN POWER OVER ETHERNET SYSTEM

This application claims priority of provisional U.S. patent application Ser. No. 60/646,509 filed on Jan. 25, 2005, and entitled "SYSTEM AND METHOD FOR SUPPORTING ADVANCED POWER OVER ETHERNET SYSTEM."

TECHNICAL FIELD

This disclosure relates to power supply systems, and more particularly, to circuitry and methodology for detection of a Powered Device (PD) in a Power over Ethernet (PoE) system.

BACKGROUND ART

Over the years, Ethernet has become the most commonly used method for local area networking. The IEEE 802.3 group, the originator of the Ethernet standard, has developed an extension to the standard, known as IEEE 802.3af, that defines supplying power over Ethernet cabling. The IEEE 802.3af standard defines a Power over Ethernet (PoE) system that involves delivering power over unshielded twisted-pair wiring from Power Sourcing Equipment (PSE) to a Powered Device (PD) located at opposite sides of a link. Traditionally, network devices such as IP phones, wireless LAN access points, personal computers and Web cameras, have required two connections: one to a LAN and another to a power supply system. The PoE system eliminates the need for additional outlets and wiring to supply power to network devices. Instead, power is supplied over Ethernet cabling used for data transmission.

As defined in the IEEE 802.3af standard, PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device. A PD is a device that is either drawing power or requesting power. PDs may be associated with such devices as digital IP telephones, wireless network access points, PDA or notebook computer docking stations, cell phone chargers and HVAC thermostats.

PSE's main functions are to search the link for a PD requesting power, optionally classify the PD, supply power to the link if a PD is detected, monitor the power on the link, and disconnect power when it is no longer requested or required. A PD participates in the PD detection procedure by presenting detection signature to request power. The PD detection signature has electrical characteristics measured by the PSE.

In particular, the PSE may probe its port with two voltages in the range from 2.8V to 10V with at least a 1V voltage difference to determine a signature resistance of the PD. The signature resistance in the range from 19 KOhm to 26.5 KOhm is considered to be a valid detection signature.

However, if the signature resistance or line changes during the measurement or if a device being detected has a non-linear resistance in the range from 2.8V to 10V, the PSE can erroneously consider a non-PoE device to be a PD. The PSE may then attempt to power this device causing damage if the device cannot tolerate the applied power.

Therefore, there is a need for a PD detection scheme that would reduce the likelihood of a false PD detection.

SUMMARY OF THE DISCLOSURE

The present disclosure offers novel circuitry and methodology for detecting a Powered Device (PD) in a system for providing power to the PD that includes PD detection circuitry for detecting the PD in a first mode by providing detection current to probe the PD, and for detecting the PD in a second mode by providing detection voltage to probe the PD. A control circuit determines that the PD is a valid device if the PD is detected both in the first mode and in the second mode.

In accordance with one aspect of the disclosure, the PD detection circuitry may determine prescribed resistance in the PD by measuring voltage produced in response to the detection current in the first mode, and by measuring current produced in response to the detection voltage in the second mode.

In accordance with an embodiment of the disclosure, the PD detection circuitry may comprise a force-current detection circuit for operating in the first mode and the force-voltage detection circuit for operating in the second mode.

The PD may be considered to be a valid device, if it is detected sequentially in the first mode and in the second mode. The first mode of detection may be carried out before the second mode. The control circuit may control the PD detection circuitry to switch it between the first and second modes.

In accordance with another aspect of the disclosure, a Power Sourcing Equipment (PSE) in a Power over Ethernet (PoE) system may comprise a PD detection source for detecting a PD in a force-current mode and in a force-voltage mode, and a control circuit for validating the PD if the PD is detected in both the force-current mode and the force-voltage mode.

The PD detection source may comprise a force-current detection circuit for producing detection current to probe the PD in the force-current mode, and the force-voltage detection circuit for producing detection voltage to probe the PD in the force-voltage mode.

Signature resistance of the PD may be determined by the force-current detection circuit by measuring voltage produced in response to the detection current, and by the force-voltage detection circuit by measuring current produced in response to the detection voltage.

The control circuit may control the force-current detection circuit to determine the signature resistance in the force-current mode, and may control the force-voltage detection circuit to determine the signature resistance in the force-voltage mode In accordance with a method of the present disclosure the following steps are carried out to detect a PD:
  determining a prescribed parameter of the PD in a force-current mode,
  determining the prescribed parameter of the PD in a force-voltage mode, and
  validating the PD if the prescribed parameter of the PD is found to be valid in both the force-current mode and the force-voltage mode.

The prescribed parameter of the PD may include prescribed resistance in the PD.

The force-voltage mode may be carried out by probing the PD with test voltage of a prescribed value. The force-current mode may be carried out by probing the PD with test current corresponding to the test voltage of the prescribed value.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made with the example of detecting a PD in PoE system. It will become apparent, however, that the concepts described herein are applicable to recognizing any connectable device provided with power in a power supply system.

Figure 1:
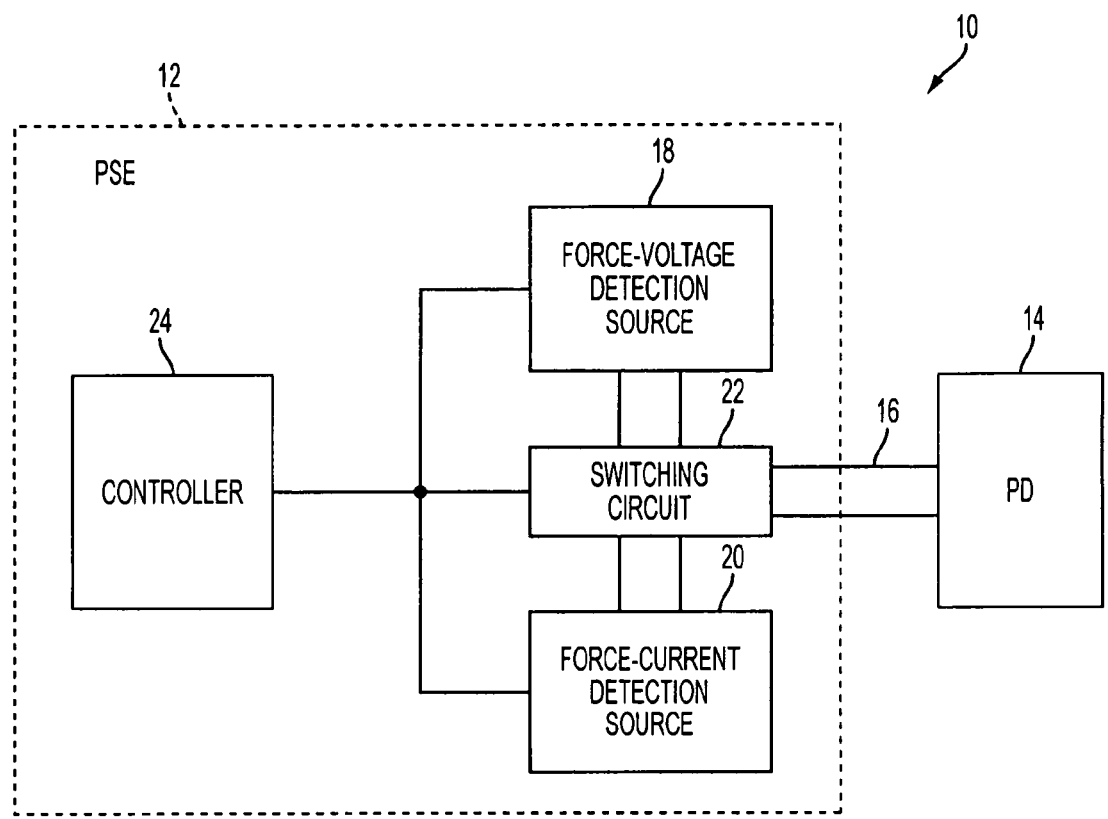
FIG. 1 is a block diagram illustrating an exemplary system for detecting a PD in accordance with the present disclosure.

FIG. 1 shows a simplified block-diagram of a PD detection system 10 of the present disclosure in a PoE system comprising a PSE 12, and a PD 14 connectable to the PSE 12 via a link 16, such as a 2-wire link defined in the IEEE 802.3af standard. The PD detection system 10 includes a force-voltage detection source 18, a force-current detection source 20, a switching circuit 22 and a controller 24 that may be arranged in the PSE 12.

Figure 2:
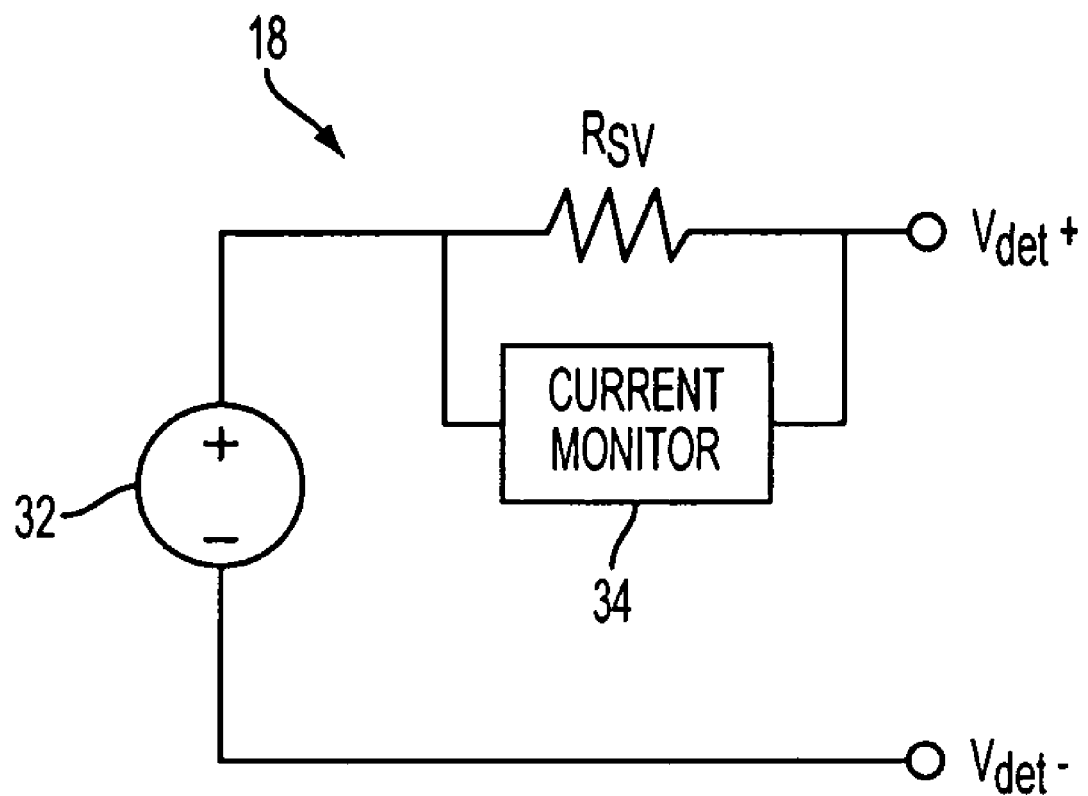
FIG. 2 is a Thevenin equivalent circuit of a force-voltage detection source.

The force-voltage detection source 18 provides detection of the PD 14 in a force-voltage mode. FIG. 2 illustrates a Thevenin equivalent circuit of the force-voltage detection source 18 that includes a voltage source 32, source resistance Rsv connected in series with the voltage source 32, and a current monitor 34 connected in parallel to the source resistance Rsv.

The force-voltage detection source 18 produces detection voltage Vdet for detecting a PD. For example, the detection voltage Vdet may be produced in the range from 2.8V to 10V, as specified in the IEEE 802.3af standard. The source resistance Rsv may be up to 100 KOhm.

In the force-voltage mode, the force-voltage detection source 18 may perform two or more tests to detect signature resistance of the PD 14. For each test, the force-voltage detection source 18 produces the detection voltage Vdet at its output terminals Vdet+ and Vdet−. The minimum voltage difference between the detection voltages Vdet produced for different detection tests is 1V.

Via the switching circuit 22, the detection voltage Vdet is applied to detection circuitry of the PD 14 including the PD signature resistance Rsig. The current monitor 34 determines current Ires produced in response to the applied detection voltage Vdet. The signature resistance Rsig of the PD 14 in the force-voltage mode of PD detection is determined as $$Rsig = \Delta Vdet / \Delta Ires,$$

where $\Delta Vdet$ is a difference between detection voltages in different tests, and $\Delta Ires$ is a difference between currents produced in response to the respective detection voltages.

The signature resistance Rsig of a PD should be in a pre-defined range. For example, for a PD compliant with the IEEE 802.3af standard, the signature resistance must be in the range from 19 KOhm to 26.5 KOm.

Figure 3:
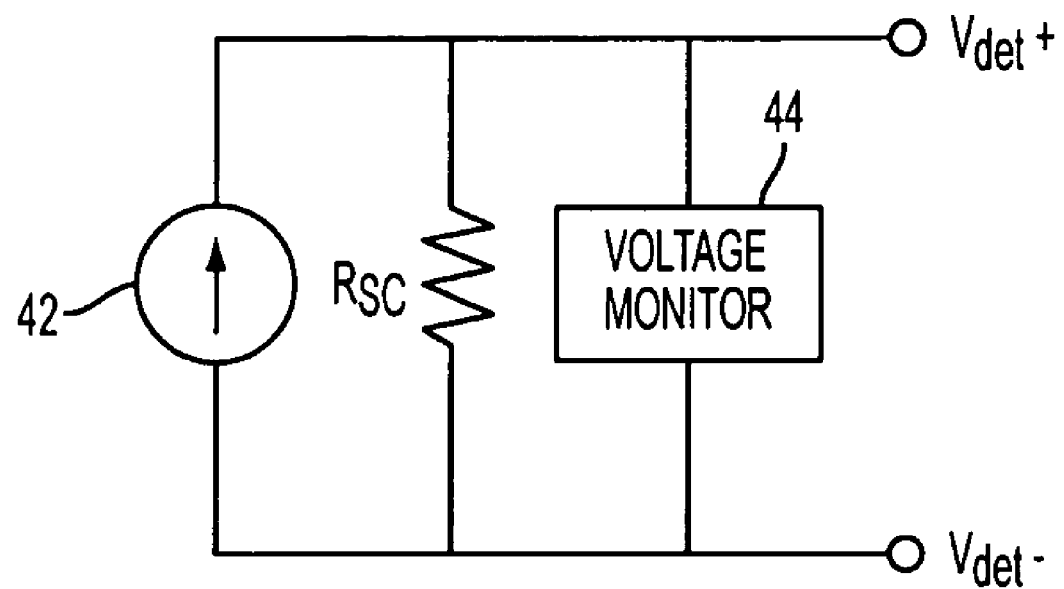
FIG. 3 is a Norton equivalent circuit of a force-current detection source.

The force-current detection source 20 provides detection of the PD 14 in a force-current detection mode. FIG. 3 shows a Norton equivalent circuit of the force-current detection source 20 that comprises a current source 42, source resistance Rsc connected in parallel to the current source 42, and a voltage monitor 44 connected in parallel to the source resistance Rsc.

In each test for detecting the PD 14, the force-current detection source 20 produces detection current Idet that corresponds to detection voltage Vdet in a pre-defined valid voltage range. For example, the valid Vdet voltage range may be from 2.8V to 10V, as specified in the IEEE 802.3af standard. The source resistance Rsc may be in the range from 100 KOhm to 100 MOhm. The minimum current difference between values of the detection current Idet produced for different detection tests corresponds to a Vdet voltage difference of 1V.

Via the switching circuit 22, the detection current Idet is supplied to the detection circuitry of the PD 14 including the PD signature resistance Rsig. The voltage monitor 34 determines voltage Vres produced in response to the supplied detection current Idet. The signature resistance Rsig of the PD 14 in the force-current mode of PD detection is determined as $$Rsig = \Delta Vres / \Delta Idet,$$

where $\Delta Idet$ is a difference between detection currents in different tests, and $\Delta Vres$ is a difference between voltages produced in response to the respective detection currents.

The switching circuit 22 coupled between the PoE link 16 and output terminals of the detection sources 18 and 20 is controlled by the controller 24 to supply the detection voltage Vdet from the force-voltage detection source 18 to the PoE link 16 in the force-voltage mode of operation, and to supply the detection current Idet from the force-current detection source 20 to the PoE link 16 in the force-current mode. Also, the switching circuit 22 transfers to the force-voltage source 18 or the force-current detection source 20 the current or voltage produced in response to the respective detection voltage or current in the force-voltage or force-current mode, respectively.

Figure 4:
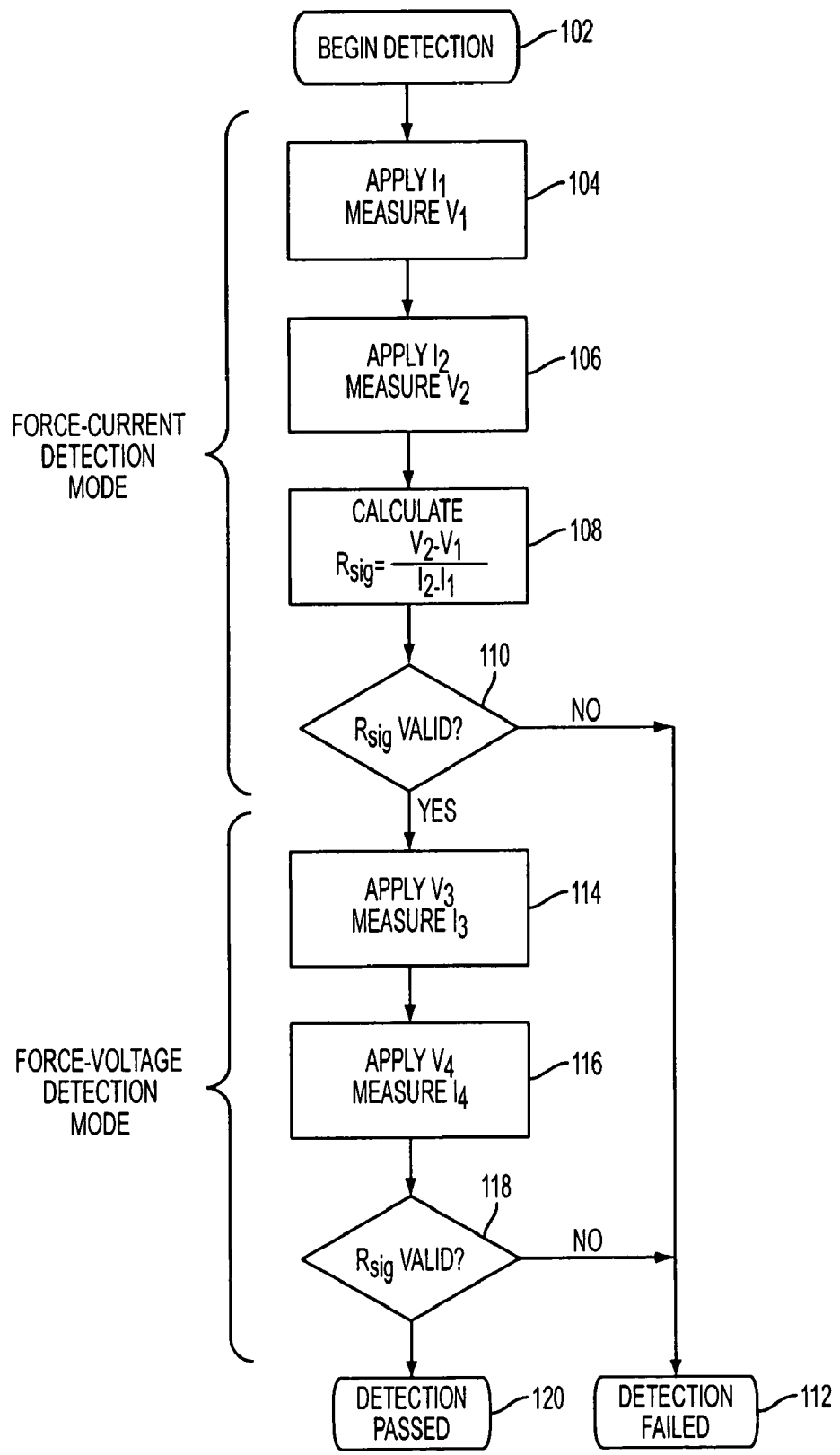
FIG. 4 is a flow chart illustrating a control algorithm for controlling operations of the system for detecting a PD in a force-current detection mode and in a force-voltage detection mode.

FIG. 4 is a flow chart illustrating a control algorithm carried out by the controller 24 to control the PD detection system 10. The controller 24 may be a state machine or a microcontroller arranged in the PSE 12. After a PD detection procedure is initiated (step 102), the controller 24 may switch the PD detection system 10 into a force-current mode. In this mode, the controller 24 controls the force-current detection source 20 to apply detection current $I_1$ to the PD 14 and measure voltage $V_1$ produced in response to the detection current $I_1$ (step 104). Thereafter, the controller 24 commands the force-current detection source 20 to apply detection current $I_2$ to the PD 14 and measure voltage $V_2$ produced in response to the detection current $I_2$ (step 106).

Based on the applied values of detection current and determined values of response voltage, the controller 24 calculates the signature resistance Rsig of the PD 14 as follows: Rsig= $(V_2-V_1)/(I_2-I_1)$ (step 108). Then, the controller 24 determines whether the signature resistance is a valid value, i.e. whether the signature resistance is within a predefined range (step 110). For example, to validate a PD compliant with the IEEE 802.3af standard, the controller 24 determines whether the signature resistance is within the range from 19 KOhm to 26.5 KOm.

If the calculated signature resistance Rsig is not a valid value, the controller 24 concludes that the PD 14 is not a device compliant with the IEEE 802.3af standard and terminates the detection procedure (step 112).

If the controller 24 determines that the signature resistance Rsig is valid, it still cannot make a conclusion as to whether the PD 14 is a device compliant with the IEEE 802.3af standard. For example, if the signature resistance of the PD 14 or PoE line changes during the measurement of response voltages, or if the PD 14 has a non-linear resistance in the range of detection values, the controller 24 can erroneously consider the PD 14 to be a device compliant with the IEEE 802.3af standard. The PSE 12 may then attempt to power this device causing damage if the device cannot tolerate the applied power.

Therefore, the controller 24 switches the PD detection system 10 in a force-voltage mode of operation to further validate the detected PD. The PD detection procedure of the present disclosure begins with the force-current detection mode because this mode enables the PD detection system 10 to better reject noise associated with the PoE line, to provide more accurate signature resistance determination. Hence, a non-compliant PD may be rejected after performing detection in the initial detection mode. However, the force-voltage detection mode may be carried out before the force-current detection mode.

In the force-voltage detection mode, the controller 24 controls the force-voltage detection source 18 to apply detection voltage $V_3$ to the PD 14 and measure current 13 produced in response to the detection voltage $V_3$ (step 114). Thereafter, the controller 24 controls the force-voltage detection source 18 to apply detection voltage $V_4$ to the PD 14 and measure current $I_4$ produced in response to the detection voltage $V_4$ (step 116).

Then, the controller 24 calculates the signature resistance Rsig of the PD 14 as follows: Rsig=$(V_4-V_3)/(I_4-I_3)$, and determines whether the calculated signature resistance is within a predefined range, i.e. a valid value (step 118). The pre-defined range for the signature resistance in the force-voltage mode may coincide with this range in the force-current mode.

If the calculated signature resistance Rsig is not a valid value, the controller 24 concludes that the PD 24 is not a PD compliant with the IEEE 802.3af standard and terminates the detection procedure (step 112). However, if the signature resistance Rsig is within the pre-defined range, the PD 14 is validated (step 120).

Before the PD 14 is considered to be a valid device, further PD detection procedures may be carried out in the force-current detection mode and/or in the force-voltage detection mode to further reduce likelihood of a false detection.

After validating the PD 14, the PSE 12 may perform a classification procedure to determine a class of the PD 14 and provide the PD 14 with requested amount of power.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A system for providing power to a powered device (PD), comprising:
   PD detection circuitry for detecting the PD in a first mode by providing detection current to probe the PD, and in a second mode by providing detection voltage to probe the PD, and
   a control circuit for determining that the PD is a valid device if the PD is detected both in the first mode and in the second mode.

2. The system of claim 1, wherein the PD detection circuitry is configured for determining voltage produced in response to the detection current in the first mode, and for determining current produced in response to the detection voltage in the second mode.

3. The system of claim 1, wherein the PD detection circuitry comprises a force-current detection circuit for operating in the first mode and a force-voltage detection circuit for operating in the second mode.

4. The system of claim 1, wherein the PD detection circuitry is configured to determine prescribed resistance in the PD in the first mode and in the second mode.

5. The system of claim 1, wherein the PD detection circuitry is configured to detect the PD sequentially in the first mode and in the second mode.

6. The system of claim 5, wherein the PD detection circuitry is controlled to detect the PD in the first mode before detecting the PD in the second mode.

7. The system of claim 1, wherein the control circuit is configured to control the PD detection circuitry to operate in the first and second modes.

8. A Power Sourcing Equipment (PSE) in a Power over Ethernet (PoE) system, comprising:
   a powered device (PD) detection source for detecting a PD in a force-current mode and a force-voltage mode, and
   a control circuit for validating the PD if the PD is detected in both the force-current mode and the force-voltage mode.

9. The PSE of claim 8, wherein the PD detection source comprises a force-current detection circuit for producing detection current to probe the PD in the force-current mode, and the force-voltage detection circuit for producing detection voltage to probe the PD in the force-voltage mode.

10. The PSE of claim 9, wherein the force-current detection circuit is configured for determining voltage produced in response to the detection current, and the force-voltage detection circuit is configured for determining current produced in response to the detection voltage.

11. The PSE of claim 8, wherein the PD detection source is configured to determine signature resistance in the force-current mode and the force-voltage mode.

12. The PSE of claim 8, wherein the PD detection source is configured to detect the PD sequentially in the force-current mode and the force-voltage mode.

13. The PSE of claim 8, wherein the PD detection source is configured to detect the PD in the force-current mode before detecting the PD in the force-voltage mode.

14. The PSE of claim 8, wherein the control circuit is configured for controlling the PD detection source to operate in the force-current mode and the force-voltage mode.

15. A method of detecting a powered device (PD), comprising the steps of:
 determining a prescribed parameter of the PD in a force-current mode,
 determining the prescribed parameter of the PD in a force-voltage mode, and
 validating the PD if the prescribed parameter of the PD is found to be valid in both the force-current mode and the force-voltage mode.

16. The method of claim 15, wherein the prescribed parameter of the PD includes prescribed resistance in the PD.

17. The method of claim 15, wherein the force-current mode and the force-voltage mode are carried out sequentially.

18. The method of claim 15, wherein the force-current mode is carried out before the force-voltage mode.

19. The method of claim 15, wherein the force-voltage mode is carried out by probing the PD with test voltage of a prescribed value.

20. The method of claim 19, wherein the force-current mode is carried out by probing the PD with test current corresponding to the test voltage of the prescribed value.

* * * * *

UNITED STATES PATENT AND TRADEMARK OFFICE
CERTIFICATE OF CORRECTION

PATENT NO. : 7,613,936 B2  Page 1 of 1
APPLICATION NO. : 11/252624
DATED : November 3, 2009
INVENTOR(S) : Stineman, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 929 days.

Signed and Sealed this

Fourteenth Day of December, 2010

David J. Kappos
*Director of the United States Patent and Trademark Office*